United States Patent [19]
Triantafyllou

[11] Patent Number: 5,997,369
[45] Date of Patent: Dec. 7, 1999

[54] HUMAN POWERED MARINE VEHICLE AND METHOD FOR THE OPERATION THEREOF

[75] Inventor: Michael S. Triantafyllou, Belmont, Mass.

[73] Assignee: Massachusetts Institute of Technology, Cambridge, Mass.

[21] Appl. No.: 09/062,121

[22] Filed: Apr. 17, 1998

Related U.S. Application Data

[63] Continuation-in-part of application No. 08/652,673, May 28, 1996, Pat. No. 5,740,750.

[51] Int. Cl.⁶ ..................................................... B63H 16/00
[52] U.S. Cl. ............................................ 440/21; 114/67 R
[58] Field of Search ................................. 440/13, 14, 15, 440/16, 21–24; 114/67 R

[56] References Cited

U.S. PATENT DOCUMENTS

| | | | |
|---|---|---|---|
| 1,458,844 | 6/1923 | Perkins | 144/332 |
| 2,936,729 | 5/1960 | Kuttner | 114/67 A |
| 5,359,574 | 10/1994 | Nadolink | 367/1 |
| 5,401,196 | 3/1995 | Triantafyllou | 440/13 |

FOREIGN PATENT DOCUMENTS

| | | |
|---|---|---|
| 30075 | 1/1926 | France . |
| 2164535 | 8/1973 | France . |
| 301446 | 5/1915 | Germany . |
| 521261 | 3/1931 | Germany ................................. 440/21 |
| 3423405 | 1/1986 | Germany . |
| 1509095 | 9/1989 | U.S.S.R. . |
| 2 223 821 | 4/1990 | United Kingdom . |

Primary Examiner—Jesus D. Sotelo
Attorney, Agent, or Firm—Wolf, Greenfield & Sacks, P.C.

[57] ABSTRACT

A human powered marine vehicle is provided having a rigid front section and a flexible rear section which may be flexed at at least two point therealong. The arms and/or legs of one or more persons in the vehicle are used to power actuators for each flex point, which actuators are operated so as to provide a predetermined relationship, and in particular at least a predetermined phase relationship, between flexure at the various points so that the flexible section moves with a wave or fish-like motion. The person(s) operating the vehicle is trained so as to maintain the predetermined relationship and various techniques are disclosed to assist the operator(s), or otherwise facilitate, the maintenance of the desired relationship.

26 Claims, 3 Drawing Sheets

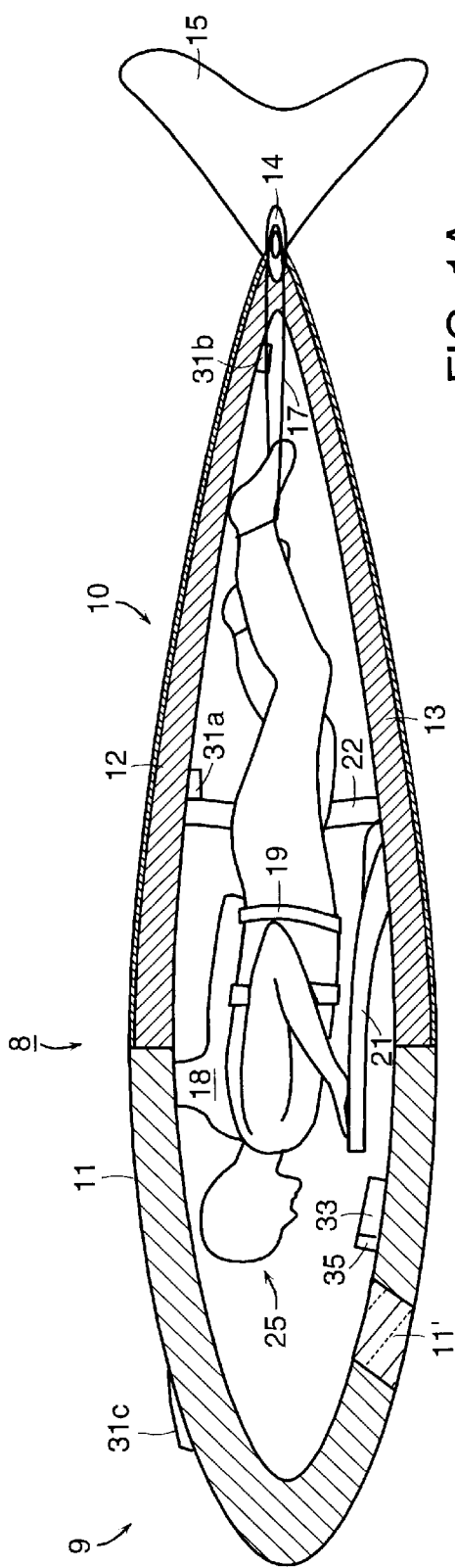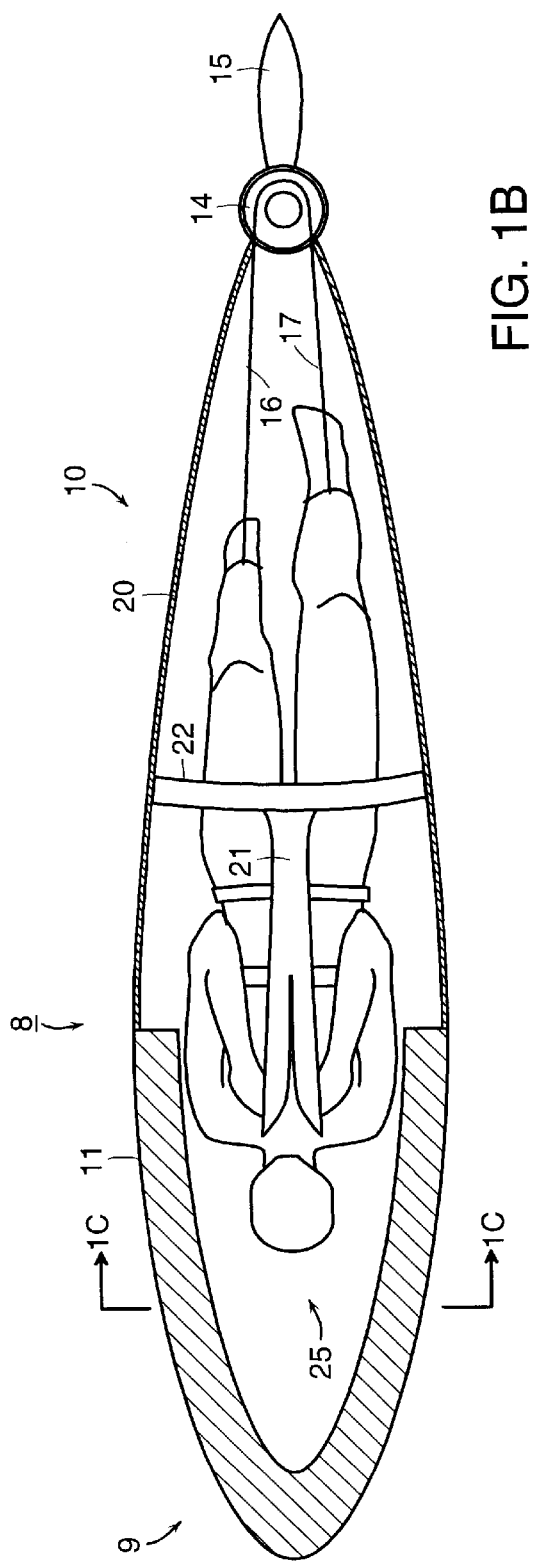
FIG. 1A
FIG. 1B

HUMAN POWERED MARINE VEHICLE AND METHOD FOR THE OPERATION THEREOF

RELATED APPLICATION

This application is a continuation-in-part of application Ser. No. 08/652,673, filed May 28, 1996, which is incorporated herein by reference, now U.S. Pat. No. 5,740,750.

This invention was made with government support under Grant Number N00014-92-J-1726 awarded by the Department of the Navy, and Grant Number NA46RG0434 awarded by the Department of Commerce. The government has certain rights in the invention.

FIELD OF THE INVENTION

This invention relates to human powered marine vehicles and methods for the operation thereof, and more particularly to such a vehicle and method which results in reduced turbulence and drag along the body of the vehicle.

BACKGROUND OF THE INVENTION

A body moving in air, water, or other fluid medium is subject to a retarding force from the fluid, which retarding force is referred to as "the drag force", or merely as "drag". Drag is a function of (a) the velocity at which the body is moving; (b) the body's shape; (c) the quality of the body surface; (d) turbulence in the flow around the body; and (e) the viscosity of the fluid medium in which the body is moving. Since energy, frequently substantial energy, must be expended to overcome this drag force in order to keep the body moving at a desired velocity, it is desirable that this drag force be minimized. Heretofore, efforts to reduce drag have concentrated on streamlining the shape of the body and on smoothing or otherwise changing the quality of the external surface of the body. For example, modest reductions in drag (5% or less) can be achieved by such changes in the body surface as the use of parallel shallow longitudinal grooves in the after body of a streamlined body. However, even when these passive steps are taken, significant turbulence still exists in the medium at various places along the body, and the resulting drag on the body still makes a significant contribution to the energy required in order to maintain desired movement of the body.

A critical parameter for purposes of drag is the Reynolds number, $R_e$, which is directly proportional to the velocity U of the body in the direction D in which the body is moving and to the length L of the body and is inversely proportional to the kinematic viscosity v of the medium (i.e., $R_e=UL/v$). When $R_e$ exceeds a value which is normally in the range of roughly 400,000–500,000, but may be somewhat above or below that range depending on the parameters of the body and of the medium, flow around the body will become turbulent (i.e., instead of flowing smoothly around the body, the flow will contain random disturbances which cause drag to increase many-fold). Unfortunately, the value of $R_e$ at which turbulence occurs is exceeded in almost all cases of practical interest. For example, a car moving at as little as 3 miles per hour has already exceeded the $R_e$ value required for turbulence to occur and a ship or plane will exceed this value for any measurable speed.

As a result, significant efforts have been expended to smooth out turbulence and make the flow around a body laminar. This is important since, if it were possible to eliminate turbulence completely, it could in many instances result in a reduction of approximately 90% in drag on the body, reducing energy requirements for moving the body tremendously. Reduced drag can also permit smaller, lighter and less expensive engines or other drive mechanisms to be utilized, further reducing costs, and can be particularly critical for human powered craft, permitting the human operator to conserve energy and therefore to be able to travel longer and further. In addition, drag in general, and turbulence in particular, cause noise which is undesirable, particularly for submersible crafts used for marine research or for war.

While some efforts have been made to reduce turbulence induced drag, particularly in marine situations, such efforts have had at best limited success and there has been virtually no work to date in reducing such drag on a human powered vehicle. Parent application Ser. No. 08/652,673 (hereinafter "the parent application") teaches a technique for reducing such drag on a body moving through a fluid by reducing turbulence at the surface of the body in much the same way that this objective is accomplished by a swimming fish, namely by active control of lateral body flexing, and in particular by causing the body to be flexed at at least two points along the length of the body, with the parameters of flexure falling within predetermined ranges and there being a predetermined phase relationship between flexure at various points along the body. By using these techniques, reduction in drag substantially in excess of 50% have been achieved. However, while the parent application indicates in general terms that such reductions in drag could also be achieved in a human powered vehicle, detailed structure and methods for the operation thereof in order to extend the teachings of the parent application to a human powered vehicle are not provided. Since a significant need exists for human powered vehicles for use in marine research, various military operations, recreation and other applications, and minimizing drag on such vehicles is critical, both for enabling the person powering the vehicle to be able to perform various projects before being overcome by fatigue and to minimize noise and turbulence from the vehicle so as to render the vehicle as noninvasive as possible in for example a research environment, a need exists for an improved, reduced drag human powered marine vehicles, and in particular for improved methods and apparatus for applying the teachings of the parent application to such human powered vehicles.

SUMMARY OF THE INVENTION

In accordance with the above, this invention provides a human powered marine vehicle which includes a front rigid section and a flexible section extending to the rear thereof, the sections being hollowed at least sufficiently to permit at least one person powering the vehicle to fit therein. An assembly is also provided which controls the position of each person within the sections of the vehicle, and at least two actuators are provided, at least one of which is positioned to be driven by at least one of the arms and legs of the person or persons in the vehicle, each of the actuators creating flexure at a different point along the flexible section. For preferred embodiments, a first actuator is positioned to be driven by arms of a person in the vehicle, and a second actuator is positioned to be driven by legs of a person in the vehicle, the actuators being positioned to be driven by the arms and legs of the same person where the vehicle is a one-person vehicle. In order to achieve reduced turbulence and drag, a predetermined relationship is maintained between the flexures at the different points along the flexible section, which relationship is preferably a predetermined phase relationship. Some means may also be provided for facilitating the maintenance of such relationship. Where the vehicle has a length L and is to be moved in a direction D in a selected fluid at a speed U, the predetermined relationship is such that the flexure of the flexible section causes a wave-like motion thereof having a frequency f, a wavelength $\lambda$ between 0.5L and 2.0L, a reduced frequency value $\Omega$ between 0.1 and 0.5, and a time delay between successive points along the flexible section reaching peaks of their flex motion which is directly proportional to the distance $x_i$ in the direction D of the point from a reference point and inversely proportional to the phase speed $c_p$ of the wave. For a preferred embodiment, the phase speed $c_p$ is substantially in the range of between U and 1.5U. A means is preferably also provided for facilitating the maintenance of the predetermined relationship, which means may for example include sensors for detecting at least one parameter at each point, which parameter is indicative of the selected relationship, and a processor operative in response to outputs from the sensor for cuing the person or persons operating the vehicle to maintain the desired relationship. The processor may have an audio output which cues the person(s) operating the vehicle, which audio output may also cue the operator(s) as to the actions required to restore the desired relationship, or the processor may provide a visual, vibratory, or other output to the operator(s) to facilitate the maintenance of the desired relationship. The two actuators may also be interconnected such that driving one of the actuators causes the other actuator to be driven in a manner to maintain the predetermined relationship, such interconnection being achieved through gears or other suitable mechanical and/or electrical components. It is preferable where the actuators are interconnected that each actuator still be positioned to be driven by the arms and/or legs of an operator(s), with the driving of two or more actuators affecting the cumulative drive force to the actuators, but not the relationship, for example the phase relationship, between them.

At least one of the actuators may also include a first component acted on by an appropriate one of the arms and legs of a person operating the vehicle and a second component attached to create flexure at a corresponding point of a flexible section, and a linkage between the first and second components such that their movements are related in a predetermined way, but are not identical. For example, the linkage could provide a mechanical advantage between the movement of the first and second components. The vehicle may also include at least one fin extending from the vehicle and positioned to be operable by a person in the vehicle for depth and pitch control, and the vehicle may include at least one ballast and a control operable by a person in the vehicle for selectively releasing the ballast to control the depth of the vehicle. The vehicle may also include a tail extending rearward from the flexible section and movable with the rear-most portion thereof. Finally, the flexible section may have at least two flexible spines extending rearward from the rigid section, at least one hoop supported by the spines, the hoops being present at the flexure points, and a flexible skin supported by the hoops which covers the flexible portion.

The invention also involves a method of operating a human powered marine vehicle which vehicle has a rigid front section and a flexible rear section, it being possible to flex the rear section at a plurality of points therealong; the method including using at least one of the arms and legs of at least one person powering the vehicle to operate a first actuator, which actuator flexes the flexible section at a first point therealong, and a second actuator which actuator flexes the flexible section at a second point spaced from and rearward of the first point, with the first and second actuators being operated so as to maintain a predetermined relationship between flexures at the first and second points. The predetermined relationship is preferably a phase relationship, and in particular is such that the flexure of the flexible section causes a wave-like motion having a frequency f, a wavelength $\lambda$ between 0.5L and 2.0L, a reduced frequency $\Omega$ between 0.1 and 0.5, and a time delay between successive points along the flexible section reaching peaks of their flex motion which is directly proportional to the distance $x_i$ in the direction D of the point from a reference point and inversely proportional to the phase speed $c_p$ of the wave. Where the vehicle is powered by a single person, the arms of the person power the first actuator and the legs of the person power the second actuator for a preferred embodiment. The method may also include the steps of detecting at least one parameter indicative of the predetermined relationship and utilizing the results of the detecting step to facilitate the maintenance of the predetermined relationship. The facilitating step may for example include providing feedback to the person operating the vehicle as to the status of the relationship between the points.

The foregoing and other objects, features and advantages of the invention will be apparent from the following more particular description of the preferred embodiments of the invention as illustrated in the accompanying drawings.

IN THE DRAWINGS

FIG. 1A is a side cutaway view of a person positioned in a marine vehicle for operation thereof in accordance with the teachings of this invention;

FIG. 1B is a cutaway bottom view of the embodiment of the invention shown in FIG. 1A;

DETAILED DESCRIPTION

Figure 1C:
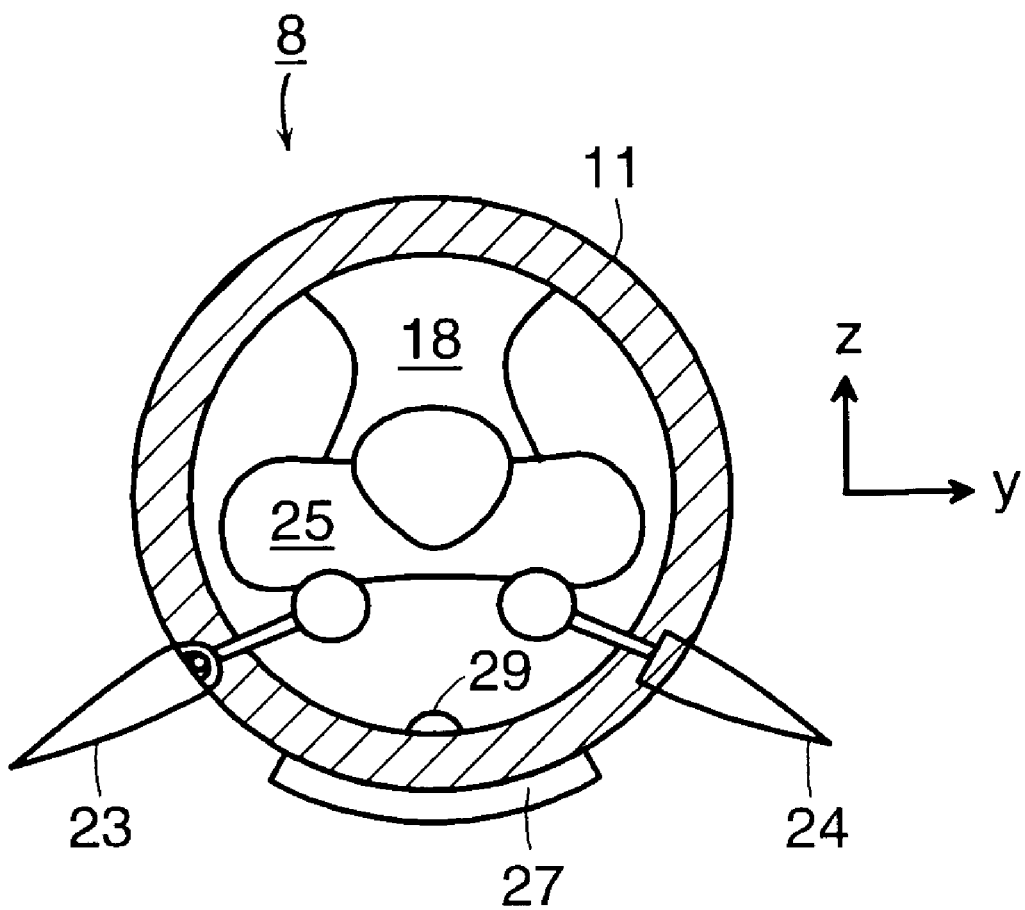
FIG. 1C is a sectional view taken along the lines C—C in FIG. 1B.

Referring to FIGS. 1A–1C, a marine vehicle 8 is shown which is formed of a rigid forward section 9 and a flexible rear section 10. Forward section 9 is formed of a hard or rigid material and is in the form of a nose-shaped shell 11 which may preferably represent up to 30% of the length of the vehicle 8. One or more windows 11' may be provided in shell 11 so that a person 25 in the vehicle may look out, or shell 11 may be formed in whole or in part of transparent material to permit viewing by the operator.

Flexible section 10 has an upper spine or backbone 12 and a lower spine or backbone 13, each of which is substantially rigid in a vertical direction as shown in FIG. 1A but is completely flexible in the horizontal direction of FIG. 1B. (i.e., is rigid in the Z direction of FIG. 1C and flexible in the Y direction). Backbones 12 and 13 extend from shell 11 to tail 15 of the vehicle. The total length of the vehicle L from the front tip of shell 11 to the rear end of flexible section 10 (not including tail 15) would normally be five to twelve feet for a vehicle such as that shown in the Figures which is designed to be operated by a single individual, and would be proportionally larger, for example twelve to twenty feet, for a vehicle to be discussed later which is designed to be operated by two individuals positioned one behind the other. A hoop 22 is affixed to spines 12 and 13 and a flexible skin which is substantially water impervious passes over the spines and hoop 22 to give vehicle 8 a generally fish-like shape. Spines 12 and 13 are attached at the tail end of the vehicle to a pulley 14 from which tail 15 extends. The legs of a person 25 operating the vehicle are strapped or otherwise attached to cords 16 and 17 which are attached at their opposite ends to pulley 14. Since pulley 14 is rigidly fixed on backbones 12 and 13, person 25 operating cords 16 and 17 in a bicycle-like motion applies torque to the pulley which bends the backbone in a manner to be described later. Since tail 15 is fixed rigidly to pulley 14, it rotates as the backbone flexes. Tail 15 is preferably formed of a flexible material. While pulley 14 may be close to the tail end of flexible section 10 as shown in the Figures, it may also be forward of the position shown, depending on the total length of vehicle 8.

A rigid structure 18 is shown which is attached at one end to the top of rigid shell 11, fits over the back of individual 25 operating the vehicle, and has belts or straps 19 which may be utilized to secure the person 25 in a desired position in vehicle 8 and to assure that there is substantially no relative rotation between the individual and at least rigid section 9 of the vehicle. The hands of person 25 are used to drive a lever 21, rigidly attached to hoop 12, which hoop is in turn rigidly fixed to the backbones 12 and 13. Thus, turning or movement of lever 21, either in a positive or negative Y direction (FIG. 1C) causes a turning of hoop 22 which in turn causes backbones 12 and 13 to flex at the location of the backbone.

Shell 11 and spines 12, 13 fit together with a sealing ring (not shown) or other suitable sealing element either therebetween or thereover. The two sections could be hinged together so that the front section can be swung open to permit person 25 to get into the vehicle, or the two sections may be completely separable and be fitted together once the person 25 is positioned thereon. Hinging is preferable since it is easier for the individual to open and close the vehicle with this configuration. At least one latch is provided on the unhinged side of the vehicle, for example a latch between spine or backbone 13 and shell 11, to seal the vehicle, and it would be preferable if this latch were operable from the inside of the vehicle to permit individual 25 to get in and out in case of an emergency. Skin 10 should also be of a nature such that person 25 may punch through or cut through the skin with a knife or other tool easily reachable by him so as to provide an alternative way of exiting vehicle 8 in case of an emergency.

Referring to FIG. 1C, a pair of side fins 23 and 24 are provided which are positioned to be reachable by the hands of the person 25 and can be used for up and down motion and pitch control in much the same way as a rudder. Vehicle 8 will normally have enough air therein so as to have a slight positive buoyancy, but not so much as to prevent the vehicle from diving below the surface when the vehicle is being powered and fins 23, 24 are suitably positioned. A combination of fin position and forward velocity can be used to maintain the vehicle at a desired depth. Similarly, fin position along with the velocity of the vehicle and its slight positive buoyancy can be used to return to the surface when desired. In an emergency, where it is necessary to bring the vehicle to the surface quickly, or where for example positive buoyancy has been lost as a result of a leak or the like, a ballast 27 may be provided on the outside of the vehicle with handle 29 inside the vehicle reachable by the person 25 to release the ballast so as to permit the vehicle to rise more quickly to the surface. The vehicle may also have an aqualung (not shown) mounted therein to permit person 25 to breathe while in the vehicle. Person 25 may use the aqualung at all times when in the vehicle or air ports may be provided in the top of for example shell 11 to permit air flow through the vehicle when the vehicle is at the surface, which ports may be sealed by person 25 before he dives the vehicle under the surface. Alternatively, an air pump may be provided for use when the vehicle is surfaced.

Finally, suitable detectors such as 31a–31b may be provided at suitable locations inside and/or outside vehicle 8 to detect various parameters at the flexure points and elsewhere, including a detector 31c (FIG. 1A) outside the vehicle, which may for example be a vane detector, for detecting vehicle velocity U, and these detectors may be connected to a processor 33 suitably mounted in the vehicle, preferably to shell 11, which processor is programmed to compute various parameters to be discussed later for operation of the vehicle in a reduced turbulence, reduce drag mode. Processor 33 includes an output device 35 adapted to produce a suitable audio, visual, vibratory or other stimuli to person 25 so as to permit the individual to operate his arms and legs so as to remain within desired parameters. Output device 35 may also include earphones being worn by the person 25, a vibratory band attached to the person's body or to other appropriate stimulus to the person.

Further, while cords 16 and 17 are shown as being connected directly to pulley 14, and lever 11 is being shown as being connected directly to hoop 12, such connection could also be made through a suitable gear box or other suitable linkage mechanism so as to for example provide a mechanical advantage between motions of the operator and the flexure motion to further enhance performance of the operator.

The operation of the hands or arms of person 25 thus cause a flexing of flexible section 10 at the point in this section where hoop 22 is located, and the operation of pulley 14 by the legs of person 25 causes flexure of the flexible section at the tail end thereof where the pulley is located. In accordance with the parent application, in order to achieve turbulence reduction, and thus to achieve reduced drag, the flexing of section 10 caused by the movement of hoop 12 and of pulley 14 must be coordinated so as to produce a wave-like motion which satisfies certain criteria. These criteria are set forth in some detail in the parent application which is incorporated herein by reference. In summarizing the criteria, first, the flexing must occur over at least the rear third of vehicle 8, and preferably over the rear two thirds to three quarters of the vehicle, since this is the portion of the vehicle where turbulence generally forms. As indicated earlier, for a human-powered vehicle, it is preferable that at least the rear 70% of the vehicle be flexible. The location on the body where turbulence begins varies somewhat with the shape of the body.

Second, since flexing only results in drag reduction when there is turbulence, flexing is normally not performed at speeds for which the Reynolds number $R_e$ is below those at which turbulence begins (i.e., for less than $R_e$=400,000–500,000). However, as indicated earlier, since these values are exceeded for almost all except very low speeds, the drag reduction techniques of this invention would typically be employed whenever the vehicle is in motion. The wavelength $\lambda$ for the traveling wave which results from the flexing of section 10 is preferably between 0.5L and 2.0L, where L is the length of vehicle 8 without tail 15. Two other parameters which are important for the traveling wave are the phase speed $c_p$ of the traveling wave, which may for example be expressed in meters per second and is obtained by the equation:

$$c_p = \frac{\omega}{k}$$

where:
ω=the angular frequency in radians per second of oscillation (ω=2π/T)
k=wave number, k=2π/λ
T=period of oscillation in seconds
λ=wavelength of oscillation in meters
f=frequency of oscillation in Hertz In substantially all instances, to achieve optimum drag reduction, the phase speed $c_p$ should be greater than the forward speed U of the body, and $c_p$ is preferably between U and 1.5U. However, in some applications, drag reduction which may for example be in the 5% range (as opposed to the 50% to 75% range with $c_p$ in the preferred range) may be achieved for a $c_p$ as low as 0.5U, and significant drag reduction can be achieved for a $c_p$ of up to 2U and beyond. Further, for preferred embodiments, the phase speed $c_p$ is substantially the same for all flexure points. However, this is not a limitation on the invention and the phase speed at flexure points may vary in a selected way; however, the phase speeds for all the flexure points should still fall within the preferred ranges indicated above.

Another very important value in drag reduction is the reduced frequency value Ω which is also sometimes referred to as the Strouhal number, and which is defined as:

$$\Omega = \frac{fA}{U}$$

where A is the maximum lateral excursion (i.e., the maximum heave motion) of the tail of flexible section 10 in the Y direction (FIG. 1C). Since as will be discussed in conjunction with FIGS. 2A–2D, the tail end of this section has the greatest lateral movement, A is therefore equal to the maximum lateral excursion of the body in the Y direction. For preferred embodiment, the reduced frequency value Ω is between 0.1 and 0.5.

Perhaps most important, the wave-like motion results in a time delay for each successive flexure point reaching the peak of its flex motion. For preferred embodiments, this time delay for a given junction is directly proportional to the distance $x_i$ of such junction from a reference point, which reference point may for example be the tip of the nose of shell 11 (i.e., the front tip of the vehicle). However, other reference points are possible. The delay is also inversely proportional to the phase speed $c_p$ of the wave at the flex point (remembering again that while $c_p$ is normally the same for all flex points, it may in some applications vary in a selected way from flex point to flex point). While the flexible section should be flexed in a harmonic transverse motion which is normally substantially sinusoidal, this is not a limitation on the invention, and all that is required is that the motion at a given point be periodic at the frequency f. The transverse motion of a given flex point, denoted by $y_i$, will be periodic with a period T, and will have a maximum peak-to-peak amplitude $A_i$ which is a function of its position $x_i$ from the reference point. Typically, $A_i$ grows from the front to tail of the flexible section. This increase may be linear, quadratic, exponential or based on some other selected relationship. There is some latitude in selecting the defining equation for this motion. The maximum $A_i$ amplitude occurs for $A_t$ where this is the amplitude at the tail of the body and may be up to 0.3L, with a preferred value of 0.2L.

It should be noted that all of what has been said above is for steady state propulsion mode. When rapid or slow maneuvering action is to be taken, for example during acceleration or deceleration, or during turns, motion can involve a large bending of the vehicle which, while still a wave shape, may vary in speed and amplitude from the values indicated above. The wave shape may also be transient and asymmetric during such periods. However, the traveling wave motion is maintained, and the values provided above are reestablished once the body returns to steady state operation. As indicated previously, tail 15 moves with the tail end of flexible section 10.

Thus, for the embodiment of FIGS. 1A–1C, the primary actuation is flexing at two points on backbones 12, 13, mainly at the location of hoop 22 and at the location of pulley 14. During normal forward motion, person 25 must be trained to sequence the motions of his arms and legs one after the other to cause a traveling wave down section 10 (i.e., first the hands, then the legs, then the hands in the opposite direction, etc.). Achieving the proper Strouhal number or reduced frequency value Ω and amplitude are part of the training as well. As indicated above, detectors of for example the time and amplitude of flexure at each flexure point and suitable feedback to the operator may be utilized to supplement the operator's training to maintain operation within the required parameters.

During starting from rest and maneuvering, both actuators may be operated simultaneously and in the same direction so as to achieve large flexing, followed by simultaneous action in the opposite direction. Once starting and/or turning is achieved, the person returns to the normal operation previously discussed.

Figure 2A:
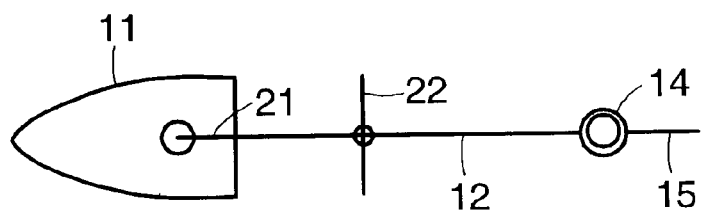
FIGS. 2A, 2B, 2C and 2D are simplified top views of the vehicle shown in FIGS. 1A–1C at various points in its operation in accordance with the teachings of this invention.
Figure 2B:
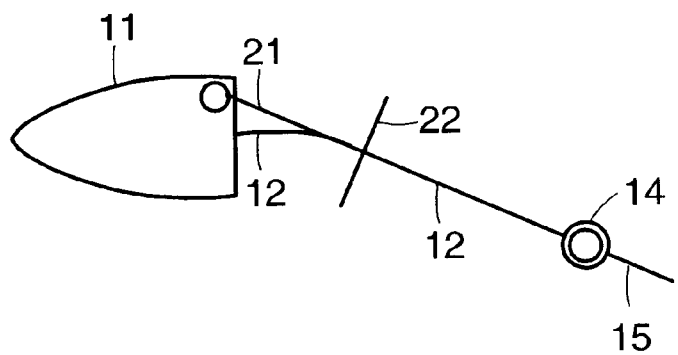
Figure 2C:
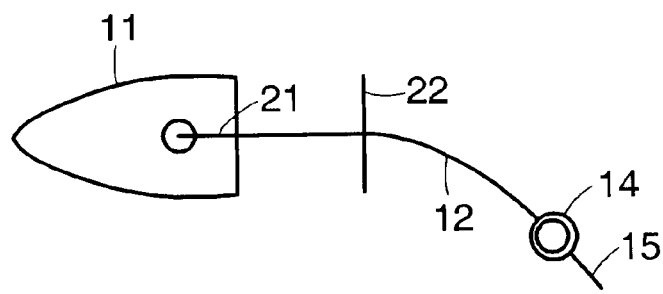
Figure 2D:
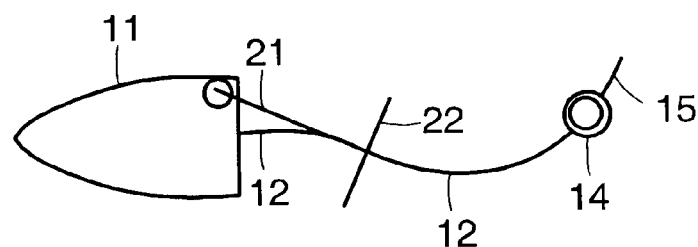

FIGS. 2A–2D illustrate such normal operation. In FIG. 2A, both hoop 22 and pulley 14 are at the rest position and the mechanism is straight. This is, for example, the starting position for operation. In FIG. 2B, person 25 has turned lever 21, causing hoop 22 to rotate the backbones 12, 13 to flex between the end of shell 11 and hoop 22. The rest of the backbone is straight. A turning of lever 21 in the opposite direction causes a mirror-symmetric motion in the opposite direction. In FIG. 2C, person 25 has moved his legs, causing pulley 14 to rotate the backbones to flex for substantially their entire length. A motion of the legs in the opposite direction causes a mirror-symmetric motion in the opposite direction. In FIG. 2D, the person has moved the lever 21 and pulley 14 in opposite directions causing the hoop and pulley to rotate in opposite directions and the backbone to flex with variable curvature. By properly sequencing these motions as previously discussed, the desired wave-like motion can be achieved.

While in the discussion above it is assumed that person 25 is trained so as to operate lever 21 and cord 16, 17/pulley 14 in appropriate sequence and with appropriate amplitude to achieve the desired wave-like motion in accordance with the required parameters, the achievement of the desired motion could be further facilitated by having the actuators interconnected through a linkage mechanism which assures the required relationship. This could be either some type of suitable mechanical linkage, or could be a computer controlled linkage operated in response to outputs from the sensors. However, a rigid mechanical linkage is not desireable since it would inhibit the motions required for start-up and maneuvering, and it is therefore necessary that either a computer controlled linkage be used which senses operator movements for start-up, etc. and disables the linkage when such conditions are detected, or that an operator controlled switch or other control be provided for disabling the linkage when necessary. The linkage could be such that only a single actuator, for example the legs, would be operated by person 25 to achieve the desired flexure at both flex points, but would preferably permit actuation for both flex points which would be joined, such as on a tandem bicycle, so as to permit the power of the output to be increased while not altering the relationship between the actuators.

Further, while two flex points are shown in the Figures each with its own actuator, additional flex points could be provided which are either independently controlled by their own actuator, for example one flex point being controlled by the person's right hand and the second actuator being controlled by the person's left hand, or two or more such actuators may be linked in the manner indicated above so as to maintain the desired relationship between the corresponding flex points. Further, while only a single person is shown operating vehicle 8 in the Figures, the vehicle could be operated by two or more persons who would preferably be placed serially one behind the other. In this case, the hands of the parties could operate levers and the legs pulleys, as shown in the Figure for a single person, with the persons being trained to coordinated their motions, providing a sequencing of flexure so as to achieve the required traveling wave down the hull. The last person's legs would drive the tail. In view of the added complexity of achieving desired phase and other relationships with multiple individuals, parameter detection and feedback to the operators would probably become more critical in a multiperson vehicle. An audio stimuli, such as a metronome, to keep the movements of the people synchronized would probably also be desirable.

While a lever mechanism has been shown in the Figures for use by the operator's arms to drive hoop 22 and pulley 14 driven by the operator's legs has been shown to drive the tail end of vehicle 8, these drive mechanism are not limitations on the invention. Thus, some type of rotary pulley mechanism may be provided to be operated by the hands of person 25 to control hoop 22, this motion may be controlled by a handle bar or a wheel mechanism operated by the person's arms or other suitable actuator mechanism may be provided. Similarly, in lieu of the cords and pulley shown in the Figures, the operator's feet may press or pull against opposite sides of a bar connected to a hoop or pulley at the tail end of the vehicle, to press against a pneumatic or hydraulic bag, or other suitable mechanisms operable by the legs of the person 25 could be utilized. Other variations in the details of construction for the vehicle 8 are also possible. Thus, while the invention has been shown and described above with reference to a preferred embodiment, and a number of variations on the preferred embodiment have been discussed, it should be understood that what has been discussed above is for purposes of illustration only, and that the foregoing and other changes in form in detail may be made in the invention by one skilled in the art without departing from the spirit and scope of the invention which is to be defined only by the following claims.

What is claimed is:

1. A human powered marine vehicle including:
   a front rigid section and a flexible section extending to the rear thereof, said sections being formed to permit at least one person powering the vehicle to fit therein;
   an assembly which controls the position of each said at least one person within said sections of the vehicle; and
   at least two actuators, at least one of which is positioned to be driven by at least one of the arms and legs of at least one person in the vehicle, each of said actuators creating flexure at a different point along said flexible section.

2. A vehicle as claimed in claim 1 wherein a first said actuator is positioned to be driven by the arms of a person in the vehicle and a second said actuator is positioned to be driven by the legs of a person in the vehicle.

3. A vehicle as claimed in claim 2 wherein the first said actuator and the second said actuator are positioned to be driven by the arms and legs respectively of the same person in the vehicle, the sections being formed to fit only a single person.

4. A vehicle as claimed in claim 1 wherein a predetermined relationship is maintained between the flexure at said points along said flexible section.

5. A vehicle as claimed in claim 4 wherein said predetermined relationship is a phase relationship including means for facilitating the maintenance of said predetermined relationship.

6. A vehicle as claimed in claim 4 wherein the vehicle has a length L and is to be moved in a direction D in a selected fluid at a speed U, and wherein the predetermined relationship is such that flexure of the flexible section causes a wave-like motion thereof having a frequency f, a wavelength $\lambda$ between 0.5L and 2.0L, a reduced frequency value $\Omega$ between 0.1 and 0.5, and a time delay between successive said points along the flexible section reaching peaks for their flex motion which is directly proportioned to the distance $x_i$ in the direct D of the point from a reference point and inversely proportional to the phase speed $c_p$ of the wave.

7. A vehicle as claimed in claim 6 wherein the phase speed $c_p$ is substantially in the range between U and 1.5U.

8. A vehicle as claimed in claim 4 wherein said means for facilitating includes sensors for detecting at least one parameter at each said point, which at least one parameter is indicative of said selected relationship, and a processor operative in response to outputs from said sensors for cuing said at least one person to maintain said relationship.

9. A vehicle as claimed in claim 8 wherein said processor has an audio output which cues said at least one person when the relationship is not being maintained.

10. A vehicle as claimed in claim 9 wherein said audio output cues said at least one person as to actions required by said at least one person to restore said relationship.

11. A vehicle as claimed in claim 4 wherein said at least two actuators are interconnected such that driving one of said actuators cause other said actuators to be driven in a manner to maintain said predetermined relationship.

12. A vehicle as claimed in claim 11 wherein each said actuator is positioned to be driven, the driving of two or more actuators affecting the cumulative drive force to the actuators, but not said predetermined relationship.

13. A vehicle as claimed in claim 1 wherein at least one said actuators includes a first component acted on by the appropriate one of arms and legs of a said person, a second component attached to create flexure at a corresponding said point, and a linkage between said first and second components such that their movement are related in a predetermined way, but are not identical.

14. A vehicle as claimed in claim 13 wherein said linkage provides a mechanical advantage between movement of said first component and said second component.

15. A vehicle as claimed in claim 1 including at least one fin extending from said vehicle and positioned to be operable by said at least one person for depth and pitch control.

16. A vehicle as claimed in claim 1 including at least one ballast, and a control operable by said at least one person for selectively releasing said ballast to control the depth of said vehicle.

17. A vehicle as claimed in claim 1 including a tail extending rearward from said flexible section and movable with a rear-most portion thereof.

18. A vehicle as claimed in claim 1 wherein said flexible section has at least two flexible spines extending rearward from said rigid section, at least one hoop supported by said spines, and a flexible skin supported by said hoops which covers the flexible portion.

19. A method for operating a human-powered marine vehicle which vehicle has a rigid front section and a flexible rear section, which rear section may be flexed at a plurality of points therealong, the method comprising the steps of:

using the arms of a person powering the vehicle to operate a first actuator which actuator flexes said flexible section at a first point therealong; and using the legs of the person to operate a second actuator which actuator flexes said flexible section at a second point which is spaced from and rearward of said first point;

said first and second actuators being operated so as to maintain a predetermined relationship between the flexures at said first and second points.

20. A method as claimed in claim 19 wherein the vehicle has a length L and is to be moved in a direction D in a selected fluid at a speed U with reduced drag, and wherein the predetermined relationship is such that flexure of the flexible section causes a wave-like motion thereof having a frequency f, a wavelength $\lambda$ between 0.5L and 2.0L, a reduced frequency value $\Omega$ between 0.1 and 0.5, and a time delay between successive said points along the flexible section reaching peaks for their flex motion which is directly proportioned to the distance $x_i$ in the direct D of the point from a reference point and inversely proportional to the phase speed $c_p$ of the wave.

21. A method for operating a human-powered marine vehicle which vehicle has a rigid front section and a flexible rear section, which rear section may be flexed at a plurality of points therealong, the method comprising the steps of:

using at least one of the arms and legs of an at least one person powering the vehicle to operate a first actuator, which actuator flexes said flexible section at a first point therealong, and a second actuator, which actuator flexes said flexible section at a second point spaced from and rearward of said first point;

said first and second actuators being operated so as to maintain a predetermined relationship between the flexures at said first and second points.

22. A method as in claim 21 wherein said predetermined relationship is a phase relationship.

23. A method as in claim 22 wherein the vehicle has a length L and is to be moved in a direction D in a selected fluid at a speed U with reduced drag, and wherein the predetermined relationship is such that flexure of the flexible section causes a wave-like motion thereof having a frequency f, a wavelength $\lambda$ between 0.5L and 2.0L, a reduced frequency value $\Omega$ between 0.1 and 0.5, and a time delay between successive said points along the flexible section reaching peaks for their flex motion which is directly proportioned to the distance $x_i$ in the direct D of the point from a reference point and inversely proportional to the phase speed $c_p$ of the wave.

24. A method as in claim 21 wherein said vehicle is powered by a single person, and wherein, during said using step, the arms of the person power the first actuator and the legs of the person power the second actuator.

25. A method as in claim 21 including the steps of detecting at least one parameter indicative of said predetermined relationship, and utilizing the results of the detecting step to facilitate the maintenance of said predetermined relationship.

26. A method as in claim 25 wherein said utilizing step includes the step of providing feedback to said person as to the status of said relationship.

* * * * *